3,485,770
OLEFIN POLYMERIZATION CATALYST BASED ON ALUMINUM PYROLATE
Alfred E. Borchert, Cherry Hill, N.J., Arlen B. Mekler, Wilmington, Del., and Richard W. Sauer, Cherry Hill, N.J., assignors to Atlantic Richfield Company, Philadelphia, Pa., a corporation of Pennsylvania
No Drawing. Filed Mar. 2, 1967, Ser. No. 619,968
Int. Cl. B01j 11/06; C07c 3/10
U.S. Cl. 252—429                8 Claims

ABSTRACT OF THE DISCLOSURE

The pyrolysis of alklaluminum compounds in a non-oxidizing, non-hydrolyzing environment produces a hydrocarbon insoluble, oxidizable solid which is characterized by the evolution of a hydrocarbon gas upon hydrolysis. Preferably, an alkylaluminum compound is heated at a temperature in excess of 400° F. for a time in excess of 6 hours. This pyrolate can then be combined with a reducible transition metal compound to provide a catalyst for the polymerization of alpha olefins.

BACKGROUND OF INVENTION

Conventional catalysts for olefin polymerization have been prepared by combining an alkylaluminum compound with a reducible transition metal compound. According to one method a hydrocarbon insoluble transition metal compound (such as titanium di- or trichloride) is combined with a hydrocarbon soluble alkylaluminum compound in a hydrocarbon diluent. That portion of the transition metal compound which is located at the outer extremity of the insoluble particle is reduced by the aluminum. The transition metal compound located within the interior of the particle, however, is not available for reduction and does not acquire catalytic properties. Another method requires the combination in a hydrocarbon diluent of a soluble transition metal compound (such as titanium tetrachloride) with a soluble alkylaluminum compound. The resultant product precipitates from solution to form a particle having the transition metal and aluminum dispersed throughout. The transition metal compound located within the interior of the particle does not, however, impart catalytic activity to the polymerization. Attempts have been made to increase the amount of available transition metal compound by depositing it up an inert support. Use of this support, however, requires additional process steps to prepare or deactiaate the catalyst. It has now been discovered that alkylaluminum compounds when pyrolyzed in a non-oxidizing, non-hydrolyzing environment produce a hydrocarbon insoluble, oxidizable solid which when combined with a reducible transition metal compound produces a catalyst for the polymerization of alpha olefins in high yields at good selectivities.

The insoluble pyrolate functions both as the reducing agent and as an active support for reduced forms of the transition metal system. The transition metal compound is present only at the surface of the pyrolate and thus after reduction is readily available to impart catalytic activity. Consequently, this new catalyst has a greater efficiency and thus requires lower optimum loadings than the prior art compounds.

Therefore, it is an object of this invention to provide a new catalysis system for the polymerization of alpha olefins.

It is a further object of this invention to provide a method for polymerization alpha olefins.

In general, the catalyst of this invention comprises the product which forms on mixing a transition metal compound with a solid, hereafter called "aluminum pyrolate," prepared by propylzing in a non-oxidizing, non-hydrolyzing environment an alkylaluminum compound having at least one alkyl group bonded to the aluminum atom, said pyrolysis being conducted at a temperature in excess of 400° F. for a time sufficient to produce a hydrocarbon insoluble, oxidizable solid which is characterized by the evolution of a hydrocarbon gas upon hydrolysis.

The alkylaluminum compound has the structural formula $RAlX_2$ wherein R is an alkyl radical and X is either an alkyl radical or hydrogen. While the specific structure of the alkyl group is not critical to the operability of compound, it has been found that some configurations are more favorable for promoting certain reactions. For example, alkyl chains having from 1 to 10 carbon atoms and particularly those which are branched in structure are most suitable. It has been found most suitable that the aluminum compound contain at least two and, preferably, three alkyl radicals. Examples of suitable alkylaluminum compounds include but are not limited to:

trimethylaluminum,
triethylaluminum,
triisohexylaluminum,
tri-n-butylaluminum,
triisopropylaluminum,
tri-n-decylaluminum,
di(isobutyl)ethylaluminum,
di(isohexyl)isobutylaluminum,
di(isopropyl)methylaluminum,
ethyl(isopropyl)isobutylaluminum,
methyl(ethyl)propylaluminum,
diisobutylaluminum hydride,
diethylaluminum hydride,
isobutylisopropylaluminum hydride,
butyl(pentyl)aluminum hydride,
isobutylaluminum dihydride and
ethylaluminum dihydride.

Mixtures of alkylaluminum compounds can also be pyrolyzed. For example, a pyrolate prepared from mixtures of from 10 to 90 percent by weight trialkylaluminum compound and from 10 to 90 percent of an alkylaluminum hydride provides an excellent cocatalyst for the polymerization of alpha olefins. The pyrolysis is conducted under the same conditons utilized with a single alkylaluminum compound.

The pyrolysis is conducted by heating the alkylaluminum compound at a temperature in excess of 400° F. for a time sufficient to produce in good yield a hydrocarbon insoluble, oxidizable solid which is characterized by the evolution of a hydrocarbon gas upon hydrolysis. The exact range of conditions which will produce this solid vary with the particular alkylaluminum compound. It has been found, for most alkylaluminum compounds, that temperatures in the range of 400° to 600° F. are required. If the temperature is less than 400° F., a liquid rather than a solid is obtained which is soluble in hydrocarbon diluents. If temperatures greater than 600° F. are utilized, a degradation occurs with most alkyaluminum compounds which produces a solid which is not capable of reducing the transition metal. Once an active aluminum pyrolate is obtained, however, continued heating at the pyrolysis temperature does not destroy the activity. For example, heating at 400° F. for over 60 hours did not destroy the properties of the pyrolate from triisobutylaluminum which had been formed after about 6 hours at this temperature. While formation of solid occurs from the beginning of the pyrolysis the minimum time necessary for high yields of a solid pyrolate is around 6 hours. Preferably, the temperature ranges from 400° to 500° F. and the time ranges from 6 to 20 hours. Most preferably, the temperature is about 440° F. and the time ranges from 6 to 8 hours.

The pyrolysis can be conducted in a closed system or under constant pressure by permitting controlled venting of the formed gases. If, however, the pressure of the system is maintained at too low a level, a reduction of the alkylaluminum compounds to inactive metallic aluminum occurs. Consequently, it is necessary to carry out the pyrolysis under pressures which allow the formation of an oxidizable solid. For the purpose of the specification and claims, an oxidizable solid is obtained when at least 20 percent by weight of the solid pyrolate is composed of compounds having at least one carbon-to-aluminum bond. Preferably, the pyrolate contains at least 50 percent by weight of compounds having at least one carbon-to-aluminum bond. It has been found that pyrolysis under pressures of less than about 70 p.s.i.g. does not produce an oxidizable pyrolate. Preferably, the pressure ranges from 90 to 2000 p.s.i.g. and most preferably, from 200 to 600 p.s.i.g. While pressures higher than 2000 p.s.i.g. can be utilized, safety and economic considerations make this type of pyrolysis less desirable. The pressure of the system may be either autogenous or externally supplied by adding either a gas which is non-oxidizing, non-hydrolyzing to the aluminum compounds such as nitrogen, helium or argon, or hydrocarbon gases such as an olefin.

The pyrolysis may be carried out either in bulk or in the presence of an inert diluent such as heptane, benzene, xylene or decalin. The concentration of alkylaluminum compound in the diluent is not critical and will normally range from 5 to 80 percent by weight. Preferably, the diluent is heptane. Furthermore, the pyrolate can be subjected to size reduction techniques such as grinding, milling and shearing to decrease the particle size and increase the available surface area. This reduction can be conducted during formation of the pyrolate or as an additional step after pyrolysis.

The pyrolates range in color from the yellowish-green of triisobutylaluminum pyrolates to the silver-gray solid obtained from triethyl- and tripropylaluminum compounds. The specific chemical structure of the pyrolate is not known. However, with solubility tests in solvents such as hydrocarbons and nitrogen containing hydrocarbons, it has been ascertained that no alkylaluminum compounds corresponding to the structure of the initial reactants are present. The chemical activity can be attributed to the presence of complex aluminum compounds, their presence being evidenced by the evolution of hydrocarbon gases upon hydrolysis. Depending upon the reaction conditions the amount of metallic aluminum produced can range in amounts to up to 80 percent. Since this metal alone cannot reduce transition metals, high metallic aluminum concentrations require higher pyrolate loadings in order to provide suitable reduction capacity.

The alpha olefins which can be polymerized by the catalyst of this invention have the structural formula

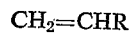

$$CH_2=CHR$$

wherein R is hydrogen or a hydrocarbon radical containing 1 to 20 carbon atoms. Particularly suitable are alpha olefins wherein R is hydrogen or a methyl or ethyl radical. Exemplary R radicals include but are not limited to alkyl, alkenyl, cycloalkyl, aryl, alkaryl and aralkyl radicals. Included are monomers such as ethylene, propylene, dodecene, styrene, 4-methyl-1-pentene, butadiene, isoprene, vinylcyclohexane, cyclopentadiene, and allyladamantane.

The reducible transition metal compounds comprise the organic and inorganic derivatives of the metals defined by Groups IV-B, V-B and VI-B of the Periodic Table. Particularly preferred are titanium, vanadium and chromium compounds. Because of the mechanism by which the catalyst is formed, (i.e., utilizing an insoluble aluminum compound) it is preferred to utilize a hydrocarbon soluble transition metal compound. This provides the best mode for distribution of transition metal on the surface of the pyrolate particle. However, insoluble transition metal compounds can be utilized if they are either reduced in particle size to within a colloidal range or are formed in situ in the presence of the aluminum pyrolate. If large particle size insoluble transition metal compounds are utilized, catalytic activity is greatly decreased due to the poor physical contact between the transition metal and aluminum pyrolate. Suitable transition metal compounds include but are not limited to the halides, oxyhalides, benzoates, acetates, and alcoholates. Preferred are the halides, particularly the tetrachlorides. Examples of various transition metal compounds include but are not limited to: titanium tetrachloride, titanium trichloride, vanadium tetrachloride, vanadium oxytrichloride, zirconium acetylacetonate, dibutoxytitanium dichloride, vanadium oxyacetylacetonate, hafnium tetraiodide, tantalum pentachloride, niobium pentachloride and wolfram hexachloride.

The olefin catalyst is prepared by first pyrolyzing the alkylaluminum compound and then combining the pyrolate with the reducible transition metal compound in an inert hydrocarbon diluent such as heptane at either ambient or elevated temperatures. The catalyst can be prepared in situ or preconditioned prior to polymerization. Furthermore, the catalyst can be altered by physical means such as by grinding, milling or shearing or by reaction with art recognized modifiers such as Lewis bases, aluminum chelates or water. The most suitable catalyst is prepared when molar ratio of aluminum in the aluminum pyrolate to transition metal in the transition metal compound ranges from about 1 to about 100. Preferably, the molar ratio ranges between 1 and 20 g.-atoms of aluminum in the pyrolate per g.-atom of transition metal in the transition metal compound.

The polymerization is carried out by contacting the alpha olefin with the catalyst in bulk or in an inert hydrocarbon diluent such as heptane, xylene or benzene. Polymerizations can be carried out at low, ambient or elevated temperatures (i.e., 0° to 300° F.) in batch or continuous operation. When the desired conversion has been reached, the catalyst is deactivated and the polymer recovered from the medium. Care must be taken not to allow the catalyst to come in uncontrollable contact with either an oxidizing system such as air or with water.

The catalyst concentration can be varied over a wide range. The optimum concentration utilized will depend upon the reaction rate and ultimate conversion desired. It has been found that quantitative conversions have been obtained with monomer to titanium ratios as high as 500 to 1 and as low as 10 to 1. Preferably, the molar ratio of monomer to titanium ranges from 200 to 1 to 50 to 1. The novel catalyst of this invention can be combined with other well-known catalyst systems so long as the additional catalyst does not destroy the activity of the former.

Other functional ingredients can be added to the polymerization. For example, compounds to control molecular weight of the resulting polymer can be added in functional amounts. The polymers of this invention can be molded into films and sheets and utilized in areas such as packaging.

The following examples are given to demonstrate specific embodiments of this invention and should not be construed as limitations upon the scope of the invention.

Example I

Into a 150 ml. stainless steel cylinder, dried and nitrogen purged, was charged 40 ml. (156 mmoles) of redistiled triisobutylaluminum. The cylinder was closed and heated for 10 hours at 440°–450° F. during which a 550 p.s.i.g. pressure developed. After cooling, the cylinder was vented and evacuated to remove hydrocarbon products. A yellow-green hydrocarbon insoluble, oxidizable solid (10 grams), which evolved hydrocarbon gases upon hydrolysis was isolated. This procedure was repeated utilizing trihexylaluminum, tri-n-propylaluminum, triethylaluminum, tri-n-butylaluminum and diethylaluminum chloride. The resultant solids were hydrocarbon insoluble, capable of undergoing oxidation, and evolved hydrocarbon gases upon hydrolysis. After combination with reducible transition metal compounds these pyrolates will polymerize alpha olefins.

Example II

A 1.6 gram quantity of triisobutylaluminum pyrolate (24.5 mg.-atoms of aluminum) (from Example I) and 50 ml. of purified n-heptane were charged to a dry polymerization vessel which was maintained under an atmosphere of nitrogen. A 0.42 gram quantity of redistilled $TiCl_4$ (2.2 mg.-atoms of titanium) was added dropwise to the resulting dispersion with stirring (Al/Ti=11.1). The resulting brown dispersion was aged at 140° F. for 30 minutes after which the temperature was raised to 176° F. Ethylene was introduced beneath the surface of the liquid using a fritted glass tube. After about ½ hour in which about 7 grams of ethylene had been introduced the addition was discontinued and the resulting polymer was precipitated by addition to excess ethanol containing HCl. Workup involved digestion in the latter, filtration, redigestion with fresh ethanol/HCl, filtration, washing with methanol and drying under vacuum at 86° F. The polyethylene was a colorless solid, 3.7 g.

Example III

A 1.3 gram quantity of triisobutylaluminum pyrolate (20 mg.-atoms of aluminum) (from Example I) and 70 ml. of purified n-heptane were charged to a dry polymerization vessel which was maintained under an atmosphere of nitrogen. A dispersion of brown $TiCl_3$ which had been prepared by combining $TiCl_4$ with aluminum alkyls in cyclohexane (0.4 mg.-atom of Ti) was added and the resulting mixture was aged at 140° F. for 30 minutes (Al/Ti=50). Purified styrene, 10 ml. (86.5 mmoles) was added and the temperature was raised to 194° F. with stirring (monomer/Ti=216). After 5 hours, the mixture was decomposed by the procedure used in Example II and treated similarly. The polystyrene was a colorless solid, 1 g. (11% conversion).

Example IV

A 1.5 gram quantity of triisobutylaluminum pyrolate (23 mg.-atoms of aluminum) (from Example II) and 50 ml. of purified n-heptane were charged to a dry polymerization vessel and 0.15 ml. of redistilled $TiCl_4$ (1.37 mg.-atoms of titanium) was added as per the procedure in Example II (Al/Ti=16.8). After aging, purified 4-methyl-1-pentene, 6.6 grams (78.4 mmoles) was added and the mixture was heated at 176° F. for 5 hours with stirring (monomer/Ti=57.2). The polymer was isolated as per the workup described in Example II. Poly(4-methyl-1-pentene), 0.7 gram was obtained as a colorless solid in 10 percent conversion.

Example V

A 0.3 gram quantity of triisobutylaluminum pyrolate (4.6 mg.-atoms of aluminum) (from Example I) and 15 ml. of purified n-heptane were charged to a dried, Pyrex glass polymerization tube equipped with a self-sealing rubber cap. A 0.1 ml. quantity of $VCl_4$ (0.94 mg.-atom of vanadium) was added by means of a syringe (Al/V=4.9). After aging for 30 minutes at 79° F., allyladamantane, 1.0 gram (5.7 mmoles) was added (all operations being carried out under $N_2$), (monomer/V=6). The tube was cooled in a Dry Ice-acetone bath, evacuated and sealed. Polymerization was carried out at 176° F. for 40 hours with shaking in an oil bath. Workup and isolation of the polymer was carried out as described in Example II. Poly(allyladamantane), a colorless solid, 0.12 gram, was obtained in 12 percent conversion.

We claim:
1. A catalyst which forms on mixing:
   (a) a catalytically active aluminum pyrolate prepared by pyrolyzing in a non-oxidizing, non-hydrolyzing environment an alkylaluminum compound having the structural formula: $RAlX_2$ wherein R is an alkyl radical and each X is either an alkyl radical or hydrogen, said pyrolysis being conducted at a temperature in excess of 400° F. for a time sufficient to produce a catalytically active solid which is characterized by the evolution of hydrocarbon gases upon hydrolysis,
with
   (b) a reducible transition metal compound, said compound being present in an amount wherein the molar ratio of aluminum in the pyrolate to transition metal in the compound ranges from about 1 to about 100.
2. A composition according to claim 1 wherein the pyrolysis is continued for a time in excess of 6 hours.
3. A composition according to claim 1 wherein the pyrolysis is conducted at a temperature ranging from 400° F. to 500° F. at a time ranging from 6 to 8 hours.
4. A composition according to claim 1 wherein the alkylaluminum compound is a trialkylaluminum.
5. A composition according to claim 4 wherein the trialkylaluminum compound is triisobutylaluminum.
6. A catalyst according to claim 1 wherein the transition metal compound is soluble in hydrocarbons.
7. A catalyst according to claim 1 wherein the transition metal is selected from the group consisting of titanium, vanadium and chromium.
8. A catalyst according to claim 1 comprising:
   (a) an aluminum pyrolate prepared by pyrolyzing in a non-oxidizing, non-hydrolyzing environment triisobutylaluminum at a temperature of 440° F. for 6 hours said pyrolate being hydrocarbon insoluble, capable of oxidation and characterized by the evolution of hydrocarbon gases upon hydrolysis
with
   (b) a compound selected from the group consisting of $TiCl_4$ and $VCl_4$.

References Cited

UNITED STATES PATENTS

| | | |
|---|---|---|
| 3,135,702 | 6/1964 | De Vries et al. |
| 3,147,230 | 9/1964 | Gladding. |
| 3,205,216 | 9/1965 | McManimie et al. |
| 3,414,553 | 12/1968 | Kern. |

PATRICK P. GARVIN, Primary Examiner

U.S. Cl. X.R.

252—431; 260—94.9, 93.5, 93.7